US012775470B2

(12) United States Patent
Wang et al.

(10) Patent No.: US 12,775,470 B2
(45) Date of Patent: Oct. 27, 2026

(54) APPLICATION STARTING METHOD, AND ELECTRONIC DEVICE AND NON-TRANSITORY COMPUTER-READABLE STORAGE MEDIUM

(71) Applicant: GUANGDONG OPPO MOBILE TELECOMMUNICATIONS CORP., LTD., Dongguan (CN)

(72) Inventors: Zhaojin Wang, Dongguan (CN); Pengbo Zhao, Dongguan (CN); Hongwei Du, Dongguan (CN); Junping Kang, Dongguan (CN); Binsheng Lei, Dongguan (CN); Ansheng Ma, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/746,798

(22) Filed: Jun. 18, 2024

(65) Prior Publication Data

US 2024/0338224 A1 Oct. 10, 2024

Related U.S. Application Data

(63) Continuation of application No. PCT/CN2022/129858, filed on Nov. 4, 2022.

(30) Foreign Application Priority Data

Dec. 21, 2021 (CN) ......................... 202111573003.0

(51) Int. Cl.
*G06F 9/445* (2018.01)
*G06F 9/54* (2006.01)

(52) U.S. Cl.
CPC .............. *G06F 9/445* (2013.01); *G06F 9/546* (2013.01)

(58) Field of Classification Search
CPC ................................. G06F 9/445; G06F 9/546
(Continued)

(56) References Cited

U.S. PATENT DOCUMENTS 5,196,728 A * 3/1993 Jaux .................... B60R 16/0315 713/320
5,721,939 A * 2/1998 Kaplan ................ G06F 40/284 704/9

(Continued)

FOREIGN PATENT DOCUMENTS

CN 102104936 A 6/2011
CN 102929532 A 2/2013

(Continued)

OTHER PUBLICATIONS

International Search Report and Written Opinion, International Application No. PCT/CN2022/129858, mailed Jan. 28, 2023 (14 pages).

(Continued)

*Primary Examiner* — Paul R. Myers
(74) *Attorney, Agent, or Firm* — Ladas & Parry LLP

(57) ABSTRACT

An application starting method is applicable to an electronic device, and the electronic device supports running of a first system and a second system. The method includes: sending, by the first system, a pre-operation message to the second system in response to a first operation event; performing, by the second system, a pre-operation indicated by the pre-operation message; sending, by the first system, an application starting message to the second system in response to a second operation event; and starting, by the second system, the target application indicated by the application starting (Continued)

message. An electronic device, and a non-transitory computer-readable storage medium are also provided.

17 Claims, 9 Drawing Sheets

(58) Field of Classification Search
USPC .......... 713/1
See application file for complete search history.

(56) References Cited

U.S. PATENT DOCUMENTS

| | | | | | |
|---|---|---|---|---|---|
| 6,010,074 | A * | 1/2000 | Kelly | G06K 7/0008 | 235/382 |
| 6,108,701 | A * | 8/2000 | Davies | H04L 61/103 | 709/224 |
| 6,154,765 | A * | 11/2000 | Hart | G06F 9/44 | 709/201 |
| 6,314,501 | B1 * | 11/2001 | Gulick | G06F 9/54 | 711/209 |
| 6,681,327 | B1 * | 1/2004 | Jardin | H04L 63/0471 | 713/153 |
| 6,931,528 | B1 * | 8/2005 | Immonen | H04L 9/3263 | 726/19 |
| 7,091,958 | B1 * | 8/2006 | Watanabe | A63F 13/426 | 345/173 |
| 7,274,368 | B1 * | 9/2007 | Keslin | G09G 5/36 | 709/219 |
| 8,862,921 | B1 * | 10/2014 | Kim | G06F 1/266 | 713/323 |
| 9,124,629 | B1 * | 9/2015 | Bowen | H04L 63/045 | |
| 12,130,685 | B2 * | 10/2024 | Lagnado | G06F 1/3209 | |
| 2006/0066566 | A1 * | 3/2006 | Law | G06F 3/0383 | 345/156 |
| 2006/0259207 | A1 * | 11/2006 | Natsume | G06F 8/65 | 701/1 |
| 2007/0143430 | A1 * | 6/2007 | Johnson | H04L 51/214 | 709/206 |
| 2007/0157320 | A1 * | 7/2007 | Collins | G06F 21/10 | 726/28 |
| 2007/0174429 | A1 * | 7/2007 | Mazzaferri | H04L 63/102 | 709/218 |
| 2008/0039072 | A1 * | 2/2008 | Bloebaum | H04M 1/72466 | 455/425 |
| 2008/0106523 | A1 * | 5/2008 | Conrad | G06F 3/033 | 345/173 |
| 2010/0291964 | A1 * | 11/2010 | Nishide | H04W 76/15 | 455/550.1 |
| 2011/0055434 | A1 * | 3/2011 | Pyers | G06F 1/3293 | 713/400 |
| 2013/0093958 | A1 * | 4/2013 | Yoshikawa | H04N 21/41422 | 348/E5.057 |
| 2013/0328779 | A1 * | 12/2013 | Butner | G06F 3/033 | 345/157 |
| 2014/0136748 | A1 * | 5/2014 | Por | G06F 1/3225 | 710/308 |
| 2014/0366039 | A1 * | 12/2014 | Giannone | G06F 9/544 | 719/314 |
| 2015/0040214 | A1 * | 2/2015 | Gao | G06F 3/041 | 726/19 |
| 2015/0302417 | A1 * | 10/2015 | DeCelles | G06Q 30/016 | 705/304 |
| 2016/0050516 | A1 * | 2/2016 | Visweswara | H04W 4/80 | 455/41.2 |
| 2016/0091957 | A1 * | 3/2016 | Partiwala | G06F 1/3243 | 713/323 |
| 2018/0139695 | A1 * | 5/2018 | Gupta | H04L 12/12 | |
| 2018/0234494 | A1 * | 8/2018 | Klemets | H04L 67/1068 | |
| 2019/0220107 | A1 * | 7/2019 | Odgers | G06F 3/0304 | |
| 2019/0369695 | A1 | 12/2019 | Wang et al. | | |
| 2019/0373128 | A1 * | 12/2019 | Kozuka | H04N 1/00896 | |
| 2020/0120604 | A1 * | 4/2020 | Nam | H04W 52/028 | |
| 2020/0403811 | A1 * | 12/2020 | Pavlou | H04L 63/166 | |
| 2021/0144639 | A1 * | 5/2021 | Zhang | H04W 52/0219 | |
| 2021/0193140 | A1 * | 6/2021 | Zhang | G10L 15/22 | |
| 2021/0389816 | A1 | 12/2021 | Weiss et al. | | |
| 2022/0241686 | A1 * | 8/2022 | Liu | A63F 13/87 | |
| 2022/0261945 | A1 * | 8/2022 | Otsuka | G06T 1/20 | |
| 2023/0007600 | A1 * | 1/2023 | Xu | H04B 17/318 | |
| 2023/0075094 | A1 * | 3/2023 | Xu | H04L 63/0245 | |
| 2023/0216732 | A1 * | 7/2023 | Liu | H04L 67/146 | 709/220 |
| 2023/0359424 | A1 * | 11/2023 | Li | G06F 3/0481 | |
| 2024/0176678 | A1 * | 5/2024 | Li | G06F 9/485 | |

FOREIGN PATENT DOCUMENTS

| | | | |
|---|---|---|---|
| CN | 108132804 | A | 6/2018 |
| CN | 109683977 | A | 4/2019 |
| CN | 111831099 | A | 10/2020 |
| CN | 112286667 | A | 1/2021 |
| CN | 112987986 | A | 6/2021 |

OTHER PUBLICATIONS

European Search Report, European Application No. 22909553.4, mailed Apr. 3, 2025 (32 pages).
India First Office Action, India Patent Application No. 202417054638, mailed Nov. 17, 2025 (8 pages).
India Hearing Notice, India Patent Application No. 202417054638, mailed May 12, 2026 (2 pages).
First Office Action, Chinese Application No. 202111573003.0, mailed Aug. 27, 2026 (22 pages).

* cited by examiner

APPLICATION STARTING METHOD, AND ELECTRONIC DEVICE AND NON-TRANSITORY COMPUTER-READABLE STORAGE MEDIUM

CROSS REFERENCE TO RELATED APPLICATIONS

The present application is a continuation-application of International (PCT) Patent Application No. PCT/CN2022/129858, filed Nov. 4, 2022, which claims foreign priority to Chinese Patent Application No. 202111573003.0, filed Dec. 21, 2021, both of which are herein incorporated by reference in their entirety.

TECHNICAL FIELD

The present disclosure relates to the field of electronic devices, and in particular to an application starting method, an electronic device, and a non-transitory computer-readable storage medium.

BACKGROUND

With the continuous development of science and technology, more and more electronic devices with different functions emerge at the historic moment, which brings many conveniences to a user's daily life.

In addition to some simple functions, such as checking time and setting alarm clock, the electronic device may also achieve some complex functions through an installed application. For example, a user may communicate instantly through an instant messaging application installed in the electronic device, and monitor sleep quality in real time through a sleep-monitoring application installed in the electronic device.

SUMMARY OF THE PRESENT DISCLOSURE

According to a first aspect, some embodiments of the present disclosure provide an application starting method. The method is applicable to an electronic device, and the electronic device supports running of a first system and a second system. The method includes: sending, by the first system, a pre-operation message to the second system in response to a first operation event; performing, by the second system, a pre-operation indicated by the pre-operation message; sending, by the first system, an application starting message to the second system in response to a second operation event; and starting, by the second system, a target application indicated by the application starting message.

According to a second aspect, some embodiments of the present disclosure provide an electronic device. The electronic device includes a processor and a memory. The memory stores at least one program, and the at least one program is configured to be execute by the processor to perform the application starting method described in the foregoing aspect.

According to a third aspect, some embodiments of the present disclosure provide a non-transitory computer-readable storage medium. The storage medium stores at least one program, and the at least one program is configured to be execute by a processor to perform the application starting method described in the foregoing aspect.

DETAILED DESCRIPTION

Figure 1:
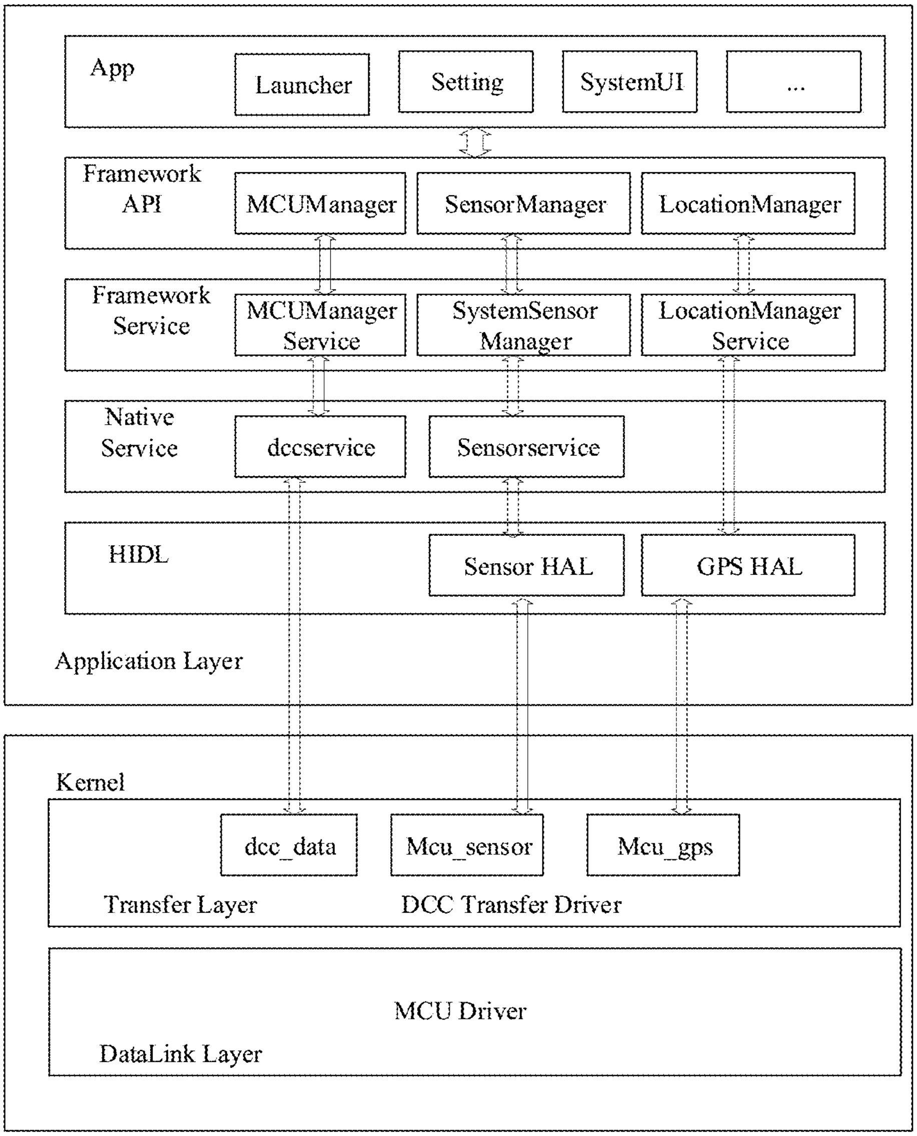
FIG. 1 is a schematic diagram of a dual-core communication software framework corresponding to a second processor according to an embodiment of the present disclosure.

In order to make the purpose, technical solutions and advantages of the present disclosure clearer, the present disclosure will be further described in detail below with reference to the accompanying drawings.

In the present disclosure, the term "multiple" or "a plurality of" means two or more. The term "and/or" may illustrate an association relationship of associated objects, indicating that three relationships can exist. For example, A and/or B may indicate: the existence of A alone, the existence of both A and B, and the existence of B alone. In addition, the character "/" may generally indicate an "or" relationship between the former object and latter object.

In the related art, an electronic device is configured with a single processor that processes, by running an operating system on the processor, all system events generated during running of the device. Therefore, the processor needs to have a powerful data processing capability and remain in a working state during the running of the device. However, the electronic device only needs to realize some functions that require low processing performance in most cases in daily use. Taking a smartwatch or a smart wristband as examples, the smartwatch or the smart wristband only needs to perform a time display and message prompt in most cases. Therefore, the processor remaining in the working state for a long time does not improve the performance of the electronic device, but increases the power consumption of the device, resulting in a shorter battery life of the electronic device (especially on a wearable device with small battery capacity).

In order to reduce the power consumption of the electronic device while ensuring the performance of the electronic device, in a possible embodiment, the electronic device is configured with at least a first processor and a second processor that have different processing performances and power consumption. The first processor is configured to run the first system, and the second processor is configured to run the second system (namely, a dual-core dual system). A set of system switching mechanisms is designed for the dual-core dual-system.

During the running of the electronic device, the first system is run by a processor with low-power consumption to process an event that requires low processing performance, and a processor with high-power consumption remains in a sleep state (correspondingly, the second system ran by the processor with high-power consumption is in the sleep state), thus reducing power consumption of the electronic device while realizing a basic function of the electronic device. When an event that require high processing performance occurs (for example, when an application program is started), the processor with high-power consumption is woken up and the second system is switched to process the event, so as to ensure that a triggered event can be responded to and processed in time to satisfy a performance requirement of the electronic device.

Since switching the processor with high-power consumption from the sleep state to a wake-up state needs to take a certain time (about 60 ms), there is a delay when starting the application in the second system from the first system. In order to reduce the delay in starting the application, the present disclosure introduces a pre-operation mechanism. When a user starts a target application in the second system from the first system through a continuous application starting operation, the first system sends a pre-operation message to the second system when the first system detects a first operation event triggered during a first operation stage of the application starting operation, and the second system is instructed to perform a pre-operation required before starting the target application display. When the first system detects a second operation event triggered during a second operation stage of the application starting operation, the first system sends an application starting message to the second system, and the second system is instructed to start the target application. Since the second system utilizes the time interval between the first operation event and the second operation event in the continuous application starting operation, a delay in starting a subsequent application may be shortened, thereby improving the speed of starting an application.

In some embodiments of the present disclosure, the first processor and the second processor work asynchronously, and the first system and the second system need to realize system communication (or referred to as dual-core communication). In a possible application scenario, the first system is a real-time operating system (RTOS) run by a micro control unit (MCU), and the second system is an Android operating system run by a central processing unit (CPU).

As illustrated in FIG. 1, FIG. 1 illustrates a dual-core communication software framework of the Android operating system according to some embodiments of the present disclosure. The dual-core communication software framework adheres to the design principles of "low coupling, high reliability, and high multiplexing", and includes developments of a kernel module, a hardware abstraction layer interface definition language (HIDL) module, a native service module, a framework service module, a framework application programming interface (API) module, and an application (APP) module.

The APP module includes functional modules such as a launcher (desktop launcher), a setting, a system user interface (UI), or the like. The framework API module includes management modules such as an MCU manager, a sensor manager, a location manager, or the like. The framework service module includes service modules such as an MCU manager service, a system sensor manager, a location manager service, or the like. The native service module includes service modules such as a data call control service (dcc service), a sensor service, or the like. The HIDL module includes modules such as a sensor hardware abstraction layer (HAL), a global positioning system (GPS) HAL, or the like. The kernel module includes DCC transfer drivers such as deciduate, Mcu_sensor, Mcu_gps, or the like.

A transport layer serves as an interface layer connecting an upper layer and a lower layer in a dual-core communication software framework. The transport layer is configured to shield a transport detail of communication at the lower layer (a data link layer) of a system from an application layer and provide a service channel for an application scenario. The application layer, as a main provider of services, is configured to respond to human-computer interaction, transmit data generated during human-computer interaction through a transmission layer, and respond to an external data request.

Figure 2:
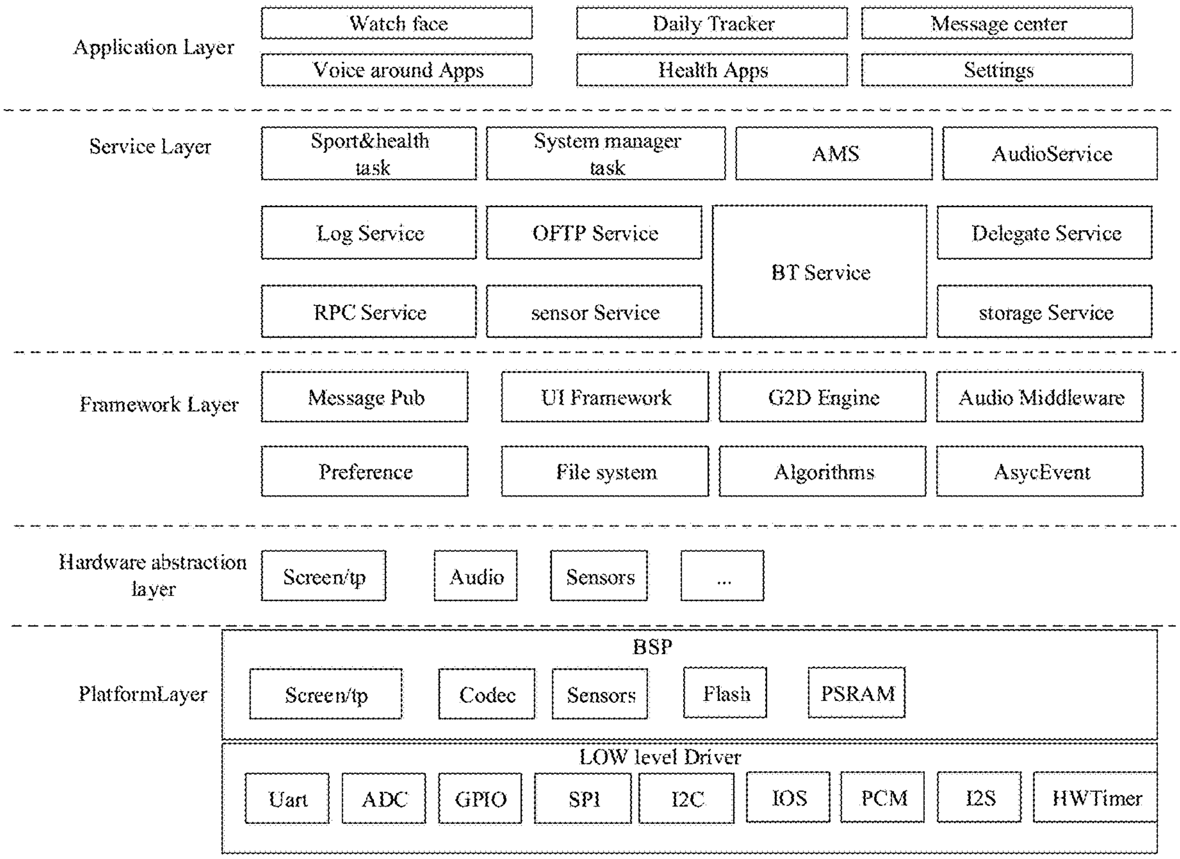
FIG. 2 is a schematic diagram of a dual-core communication software framework corresponding to a first processor according to an embodiment of the present disclosure.

The RTOS is designed under the principle of equivalence. Taking the electronic device as a smartwatch as an example, as illustrated in FIG. 2, FIG. 2 illustrates a dual-core communication software framework of the RTOS according to some embodiments of the present disclosure.

The dual-core communication software framework of the RTOS is divided into an application layer, a service layer, a framework layer, a HAL, and a platform layer.

The application layer includes application modules such as a watch face, a daily tracker, a message center, voice around Apps, health Apps, settings, or the like. The service layer includes service modules such as a sport & health task, a system manager task, an activity management service (AMS), an audio service, a log service, an Odette file transfer protocol (OFTP) service, a Bluetooth (BT) service, a delegate service, a remote procedure call (RPC) service, a sensor service, a storage service, or the like. The framework layer includes framework modules such as a message pub, a UI framework, a graphics 2D (G2D) Engine, an audio middleware, a preference, a file system, algorithms, an AsycEvent, or the like. The HAL includes hardware abstraction modules such as a screen/touch panel (TP), sensors, or the like. The platform layer includes a board support package (BSP) and a low-level driver, where the BSP includes a screen/TP, a codec, sensors, a flash, a pseudo static random access memory (PSRAM), or the like; and the low-level driver includes a universal asynchronous receiver/transmitter (Uart), an analog-to-digital converter (ADC), a general purpose input/output (GPIO), a serial peripheral interface (SPI), an inter-integrated circuit (I2C), an input/output system (IOS), a pulse-code modulation (PCM), an inter-IC sound (I2S), and a hardware (HW) timer.

The foregoing dual-core communication software framework is only used for exemplary description, and a person skilled in the art may add, delete or modify the foregoing framework according to actual requirements. The present disclosure does not limit a specific structure of the dual-core communication software framework.

Figure 3:
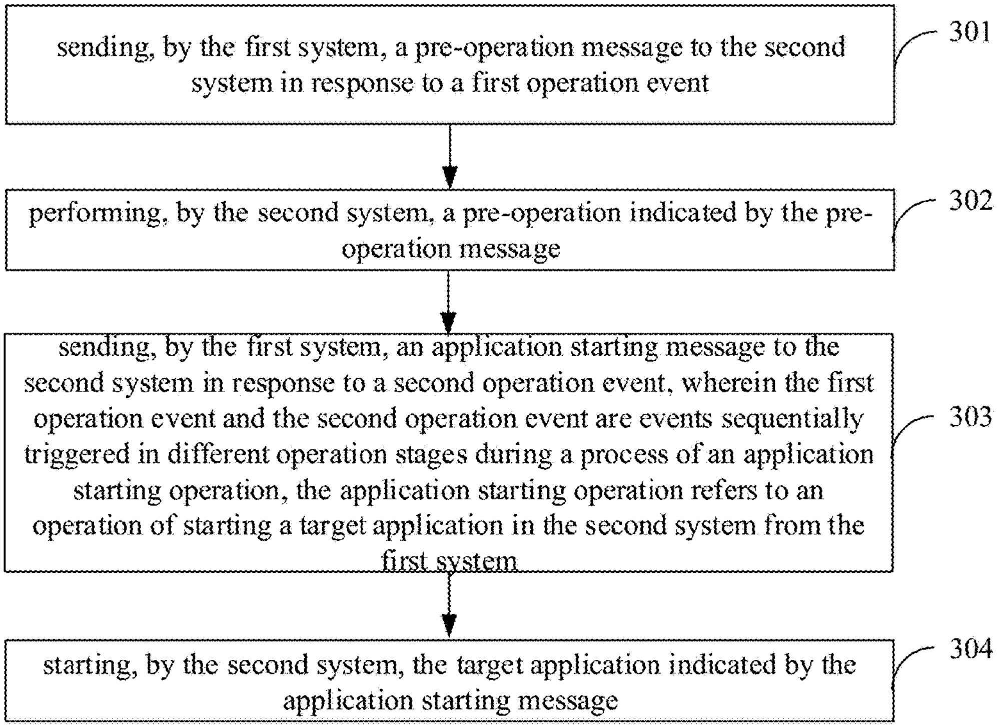
FIG. 3 is a flowchart of an application starting method according to an embodiment of the present disclosure.

As illustrated in FIG. 3, FIG. 3 is a flowchart of an application starting method according to an embodiment of the present disclosure. In the embodiment, for example, the method is applicable to an electronic device that supports running of a first system and a second system. The method may include the following operations.

At block 301, the first system sends a pre-operation message to a second system in response to a first operation event.

In some embodiments, operating power consumption of the first system is lower than that of the second system.

In a possible embodiment, the electronic device is arranged with a first processor and a second processor. Processing performance of the first processor is lower than that of the second processor (both processing capacity and processing speed of the first processor are lower than those of the second processor), and power consumption of the first processor is lower than that of the second processor. Correspondingly, the second system (run by the second processor) is capable of processing an event processed by the first system (run by the first processor), and the first system may not be able to process the event processed by the second system.

In another possible embodiment, the electronic device may be arranged with a single processor. The first system and the second system are respectively run by different cores of the processor. The processing performance of a core running the second system is higher than processing performance of a core running the first system.

Taking the electronic device as a smartwatch as an example, the first processor is an MCU, the second processor is a CPU, the first system is a RTOS, and the second system is an Android system. Correspondingly, an event that may be processed by the first system includes scenarios requiring low processing performance or weak interaction scenarios, such as watch face display, watch-face interface switch, notification-and-message display, etc. An event that may be processed by the second system includes scenarios requiring high processing performance or strong interaction scenarios, such as incoming calls answering, application starting, watch-face editing, function setting, etc.

In a possible embodiment, a working mode of the electronic device may include a performance mode, a hybrid mode, or a low-power mode. In the performance mode, the second processor and the first processor both remain in the wake-up state (correspondingly, both the first system and the second system are in the wake-up state). In the low-power mode, only the first processor remains in the wake-up state, and the second processor is in an off state (that is, the first system is in the wake-up state, and the second system is in the off state). In the hybrid mode, the second processor is in a standby state and may switch between the sleep state and the wake-up state when the first system processes an event (that is, when the first system is in the wake-up state, the second system may be in the wake-up state or in the sleep state).

In some embodiments, in the wake-up state, system-related data is cached in a memory such as a random access memory (RAM) and can be run at any time. In the sleep state, most hardware modules of the processor are turned off, system-related data is stored in a hard disk such as a read-only memory (ROM), and the system-related data is written into the memory from the hard disk when the sleep state is switched to the wake-up state.

Unlike an electronic device with strong interaction such as a smartphone, the wearable device is an auxiliary electronic device and only has weak interactions with a user in most usage scenarios. For example, the user only raises their wrists to check the time or message prompt through the smartwatch in most scenarios. Therefore, the second processor is controlled to be in the sleep state (that is, the second system is controlled to be in the sleep state) to reduce overall power consumption of the wearable device when the wearable device processes the event by the first system. For convenience of description, the wearable device is taken as an example in the following embodiments.

In some embodiments, when the first system is in the wake-up state, the electronic device displays a system interface of the first system, for example, the wearable device displays the watch-face interface. In a possible application scenario, when the first system is in the wake-up state, the second system is in the sleep state. In another possible application scenario, when the first system is in the wake-up state, the second system is also in the wake-up state, and the first system is in a foreground running state, while the second system is in a background running state.

In some embodiments of the present disclosure, an application installed in the electronic device supports running in the second system and triggering starting from the first system. In some embodiments, an application that may supporting being triggered to start from the first system may be a default application or a user-customized application.

When the user wants to start the target application in the second system from the first system, the user may perform a specific application starting operation. The application starting operation is a continuous operation, that is, the application starting operation lasts for a certain duration from the beginning of the operation to the end of the operation. In some embodiments, the application starting operation is at least one of a click operation, a key-pressing operation, or a moving operation. The present disclosure does not limit a specific application starting operation.

In some embodiments, in the wake-up state, the first system monitors in real time the first operation event triggered by the application starting operation. When the first operation event is monitored, a pre-operation message is sent to the second system, and the second system is instructed to perform the pre-operation. First operation events corresponding to different application starting operations may be the same or different.

In some embodiments, the first action event is one triggered in a beginning stage of the application starting operation.

In some embodiments, based on a state of the second system, the first system determines a manner of sending the pre-operation message to the second system and a message content of the pre-operation message. In a possible embodiment, the first system sends the pre-operation message to the second system in a manner of a dual-core communication. Alternatively, the first system sends the pre-operation message to the second system in a manner of sending an interrupt.

At block 302, the second system performs the pre-operation indicated by the pre-operation message.

Correspondingly, after receiving the pre-operation message, the second system performs the pre-operation indicated by the pre-operation message. The pre-operation serves as an operation required to be performed before the second system displays the application. For example, the pre-operation serves as a wake-up operation (when the second system is in the sleep state) or a screen-brightening operation (when the second system is in the background running state).

At block 303, the first system sends an application starting message to the second system in response to the second operation event. The first operation event and the second operation event are events sequentially triggered in different operation stages during a process of an application starting operation. The application starting operation refers to an operation of starting a target application in the second system from the first system.

In a possible embodiment, after monitoring the first operation event, the first system continues to monitor the second operation event. In addition, when monitoring the second operation event, the first system determines that a complete application starting operation is received, and sends the application starting message to the second system. Second operation events corresponding to different application starting operations may be the same or different.

In some embodiments, the second operation event is one triggered in an end stage of the application starting operation, that is, the second operation event is monitored after the first operation event.

Since the first operation event may not be triggered by the application starting operation, the first system does not directly send the application starting message to the second system when the first operation event is monitored by the first system. Instead, the first system sends the application starting message to the second system when the second operation event is monitored, which facilitates reducing the probability of application starting errors.

In a possible embodiment, the first system determines the target application to be started by the second system based on the application starting operation, and sends the application starting message to the second system based on the target application. In some embodiments, the first system sends the application starting message to the second system in the manner of the dual-core communication.

At block 304, the second system starts the target application indicated by the application starting message.

Correspondingly, when receiving the application starting message, the second system starts the target application indicated by the application starting message. If the pre-operation is not completed when the application starting message is received, the second system first performs the pre-operation, and then performs the application starting operation.

In conclusion, in embodiments of the present disclosure, for the electronic device supporting dual systems, if the first operation event triggered by the application starting operation is received when the first system is in the wake-up state, the first system sends the pre-operation message to the second system, and the second system is instructed to perform the pre-operation. When the second operation event triggered by the application starting operation is received, the first system sends the application starting message to the second system, and the second system is instructed to start the target application. During a continuous process of the application starting operation, the first operation event triggered first by the first system indicates the pre-operation required to be performed before the second system displays the application, thereby improving the speed of starting the target application after the second system receives the application starting message and facilitating reducing the delay in starting the target application in the second system from the first system.

In some embodiments, the sending, by the first system, a pre-operation message to the second system in response to a first operation event, includes: sending, by the first system, a pre-wake-up message to the second system in response to the first operation event, when the second system is in the sleep state.

The performing, by the second system, a pre-operation indicated by the pre-operation message, includes: performing, by the second system, a pre-wake-up operation.

In some embodiments, the method further includes: setting, by the second system, a sleep prohibition duration, where the second system is prohibited from entering the sleep state within a sleep prohibition duration after being pre-woken-up.

In some embodiments, the sending, by the first system, a pre-operation message to the second system in response to a first operation event, includes: sending, by the first system, a pre-brightening screen message to the second system in response to the first operation event, when the second system is in a wake-up state.

The performing, by the second system, a pre-operation indicated by the pre-operation message, includes: performing, by the second system, a pre-brightening screen operation.

In some embodiment, the application starting operation is a click operation.

The sending, by the first system, a pre-operation message to the second system in response to a first operation event, includes: sending, by the first system, the pre-operation message to the second system in response to a touch down event.

The sending, by the first system, an application starting message to the second system in response to a second operation event, includes: sending, by the first system, the application starting message to the second system in response to a touch up event.

In some embodiments, the sending, by the first system, the pre-operation message to the second system in response to a touch down event, includes: sending, by the first system, the pre-operation message to the second system in response to the touch down event and there being an intersection between an intersection between a touch area corresponding to the touch down event and a target control area. The target control area is a display area of the target control in a system interface of the first system, and the target control is configured to start the target application in the second system.

The sending, by the first system, the application starting message to the second system in response to a touch up event, includes: sending, by the first system, the application starting message to the second system in response to the touch up event, where the application starting message includes an application identifier of the target application, and the application identifier is determined based on the target control area.

In some embodiments, the method further includes the following operations.

The second system sends a control update message to the first system in response to the second system being in the wake-up state, where the control update message includes control area information of the target control and the application identifier of the target application.

The first system stores the control area information and the application identifier.

In some embodiments, the sending, by the second system, a control update message to the first system in response to the second system being in the wake-up state, includes: determining, by the second system, control layout information of a switched system interface in response to an interface switching operation, when the second system is in the wake-up state, where the interface switching operation is configured to switch the system interface of the first system, and sending, by the second system, the control update message to the first system based on the control layout information.

In some embodiments, the sending, by the second system, a control update message to the first system in response to the second system being in the wake-up state, includes: determining, by the second system, control layout information of an edited system interface in response to an interface editing operation, when the second system is in the wake-up state, where the interface editing operation is configured to edit the system interface of the first system, and sending, by the second system, the control update message to the first system based on the control layout information.

In some embodiment, the application starting operation is a key-pressing operation.

The sending, by the first system, a pre-operation message to the second system in response to a first operation event, includes: sending, by the first system, the pre-operation message to the second system in response to a key down event.

The sending, by the first system, an application starting message to the second system in response to a second operation event, includes: sending, by the first system, the application starting message to the second system in response to a key up event.

In some embodiments, the sending, by the first system, the pre-operation message to the second system in response to a key up event, includes: sending, by the first system, the application starting message to the second system based on the number of pressing times of the key-pressing operation, where the different numbers of pressing times correspond to different applications. In some embodiment, the application starting operation is a moving operation.

The sending, by the first system, a pre-operation message to the second system in response to a first operation event, includes: sending, by the first system, the pre-operation message to the second system in response to a touch move event.

The sending, by the first system, an application starting message to the second system in response to a second operation event, includes: sending, by the first system, the application starting message to the second system in response to a touch up event.

In some embodiments, the sending, by the first system, the pre-operation message to the second system in response to a touch move event, includes: sending, by the first system, the pre-operation message to the second system in response to the touch move event and a moving parameter meeting a system switching condition.

In some embodiments, the sending, by the first system, the pre-operation message to the second system in response to the touch move event and a moving parameter meeting a system switching condition, includes: sending, by the first system, the pre-operation message to the second system in response to the touch move event, a moving direction being a target direction, and a moving distance being greater than a distance threshold.

The sending, by the first system, the application starting message to the second system in response to a touch-up even, includes: sending, by the first system, the application starting message to the second system in response to the touch up event and the moving distance being greater than the distance threshold.

In some embodiments, operating power consumption of the first system is lower than that of the second system.

In a possible embodiment, the first system determines the pre-operation required to be performed by the second system based on the system state of the second system, and sends the corresponding pre-operation message to the second system, which may include the following two cases.

1. The Second System being in Sleep State

When the second system is in the sleep state, the second system needs to perform a system wake-up before starting the application. Therefore, the first system sends the pre-wake-up message to the second system in response to the first operation event, and the second system is instructed to perform the pre-wake-up operation.

In a possible embodiment, the first processor instructs the second processor to switch from the sleep state to the wake-up state in the manner of sending an interrupt.

Since the first system instructs the second system to pre-wake-up during the beginning stage of the application starting operation, the second system is capable of switching from the sleep state to the wake-up state in advance during a process of the application starting operation. Compared with switching from the sleep state to the wake-up state after the application starting operation is completed, it may accelerate an application starting process in the second system in the sleep state, thereby reducing the delay in starting the application.

Since it takes a certain duration from the beginning of the application starting operation to the end o of the application starting operation, and the second system in the wake-up state does not receive the operation within a certain period of time and may re-enter the sleep state. Therefore, in a possible embodiment, in order to prevent the second system from switching back to the sleep state during the performing process of the application starting operation, the second system sets a sleep prohibition duration when the second system performs the pre-wake-up operation, such that the second system may remain in the wake-up state within a sleep prohibition duration after being pre-woken-up (that is, the second system module is prohibited from entering the sleep state). For example, the sleep prohibition duration set by the second system may be Is, that is, the second system is unable to enter the sleep state again within Is after being pre-woken-up.

In some embodiments, after receiving the application starting message sent by the first system, the second system cancels the sleep prohibition duration, so as to prevent the second system from being in the wake-up state for a long time, thereby reducing the power consumption of the electronic device.

After the second system is switched to the wake-up state, the second system needs to perform other operations, such as brightening screen operation, which is not be repeated herein.

Figure 4:
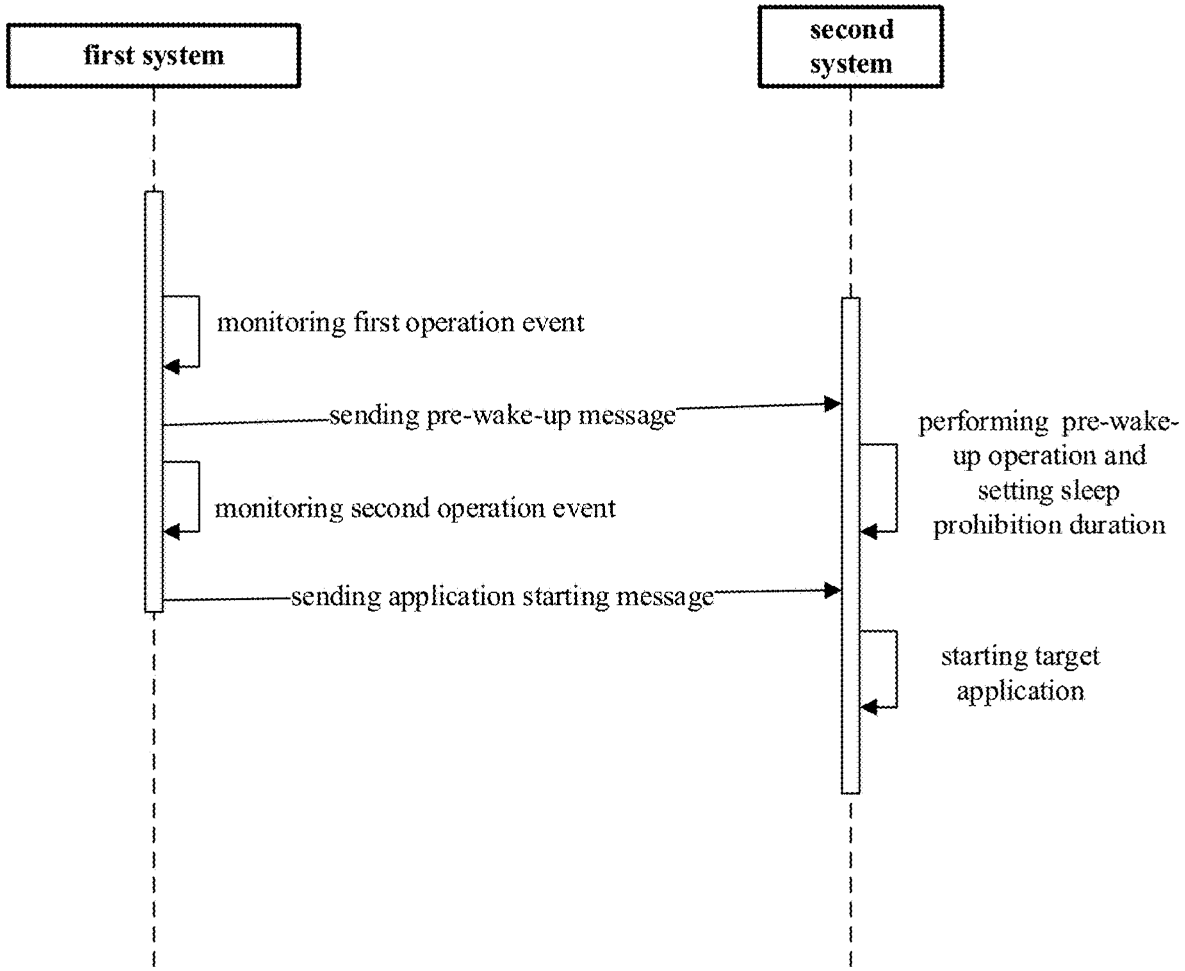
FIG. 4 is a sequence diagram of a system interaction during an application starting process according to an embodiment of the present disclosure.

As illustrated in FIG. 4, the first system is in a wake-up state and the second system is in a sleep state, a pre-wake-up message is sent to the second system when the first operation event is monitored by the first system. After receiving the pre-wake-up message, the second system performs the pre-wake-up operation and sets the sleep prohibition duration. When the second operation event is monitored subsequently by the first system, the application starting message is sent to the second system. The second system starts the target application based on the application starting message.

2. The Second System being in Wake-Up State

When the first system is in the foreground running state and the second system is in the wake-up state, a display authority of a graphical user interface (GUI) is located in the first system (that is, the system interface of the first system is currently displayed), a state of the screen corresponding to the first system is on, and a state of the screen corresponding to the second system is off. The second system needs to set the screen state to on before starting the application, and it takes a certain amount of time to set the screen state. Therefore, in order to reduce delay in starting the application, the first system sends a pre-brightening screen message to the second system in response to the first operation event, the second system is instructed to perform the pre-brightening screen operation, that is, the screen state of the second system is set to on.

In a possible embodiment, the first system sends a pre-brightening screen message to the second system in the manner of the dual-core communication.

Since the first system instructs the second system to pre-brighten the screen during the beginning stage of the application starting operation, the second system may perform the brightening screen operation in advance during the process of the application starting operation. Compared with performing the brightening screen operation after the application starting operation is completed, it may accelerate an application starting process in the second system in the sleep state, thereby reducing the delay in starting the application. The brightening screen operation refers to an operation on a software layer, and includes a brightening screen starting operation on a framework layer, a screen state setting operation (i.e., changing the screen state corresponding to the second system from off to on), and so on, which is not limited in this embodiment.

Figure 5:
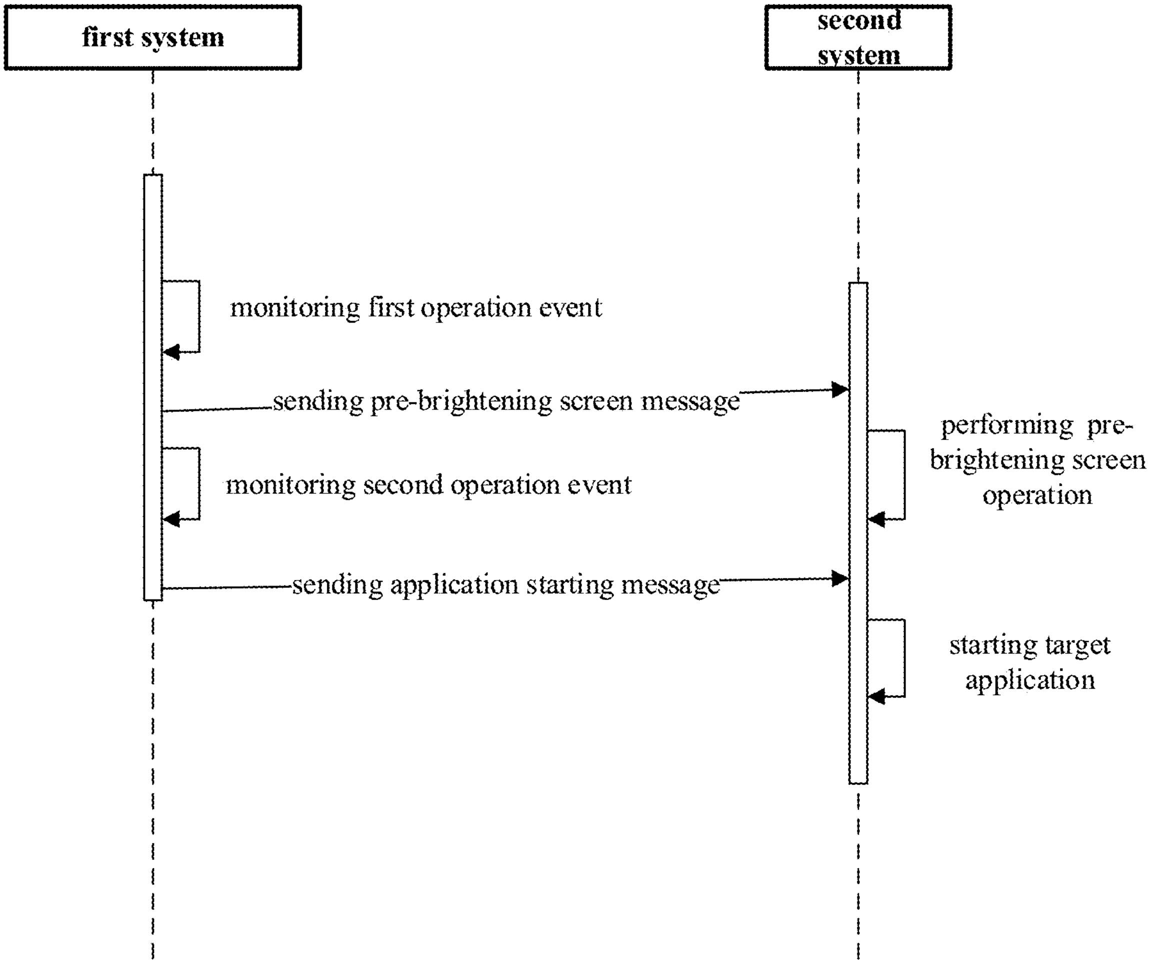
FIG. 5 is a sequence diagram of a system interaction during an application starting process according to another embodiment of the present disclosure.

As illustrated in FIG. 5, when the first system is in the wake-up state and the second system is in the wake-up state, the pre-brightening screen message is sent to the second system when the first operation event is monitored by the first system. After receiving the pre-brightening screen message, the second system performs the pre-brightening screen operation, and sets the screen state to on. When the second operation event is monitored subsequently by the first system, the application starting message is sent to the second system. The second system starts the target application based on the application starting message.

In the embodiment, when the first operation event is monitored by the first system, the second system is instructed to perform the pre-wake-up operation by sending the pre-wake-up message, or the second system is instructed to perform the pre-brightening operation by sending the pre-brightening message, so as to reduce the delay in starting the application. In addition, when the second system performs the pre-wake-up operation, the sleep prohibition duration is set at the same time, so as to prevent the second system from entering the sleep state again during an operation process of switching the application, thereby ensuring the effectiveness of the pre-wake-up operation.

During regular use, the user may start the application in the second system from the first system by clicking the control displayed on the system interface, pressing the physical key, a gesture operation, or the like. There are also differences in the operation event monitored by the first system for different application starting operations. Exemplary embodiments are described below for illustrate the application starting process under different application starting operations, respectively.

Figure 6:
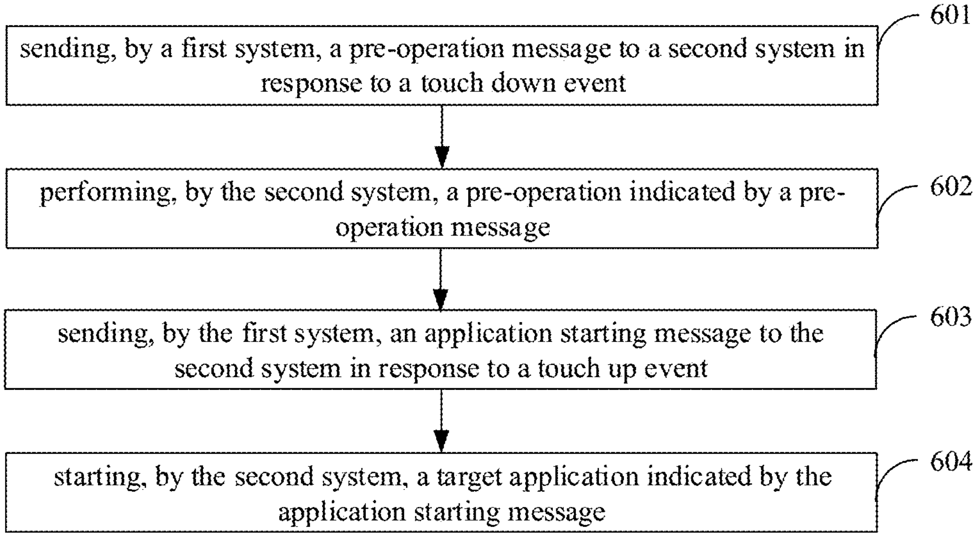
FIG. 6 is a flowchart of an application starting method according to another embodiment of the present disclosure.

As illustrated in FIG. 6, FIG. 6 is a flowchart of an application starting method according to another embodiment of the present disclosure. In this embodiment, the application starting operation as a click operation is taken as an example for illustration, and the method may include the following operations.

At block 601, a first system sends a pre-operation message to a second system in response to a touch down event.

In some embodiments, when the first system is in a wake-up state, the electronic device displays a system interface of the first system, for example, the smartwatch displays the watch-face interface. In order to facilitate a user to quickly start an application in the second system, the system interface of the first system is arranged with a control (the control is displayed by default or customized by the user on the watch face interface), and the control is configured to trigger the starting of a specific application in the second system. The control may be a widget, a state bar, an indicator, etc. For example, a temperature indicator is displayed on the watch-face interface, and a weather application installed in the second system may be started by clicking the temperature indicator. A motion widget is displayed on the watch-face interface, and the sports application installed in the second system may be started by clicking the motion widget.

Since it takes a certain amount of time from the beginning of clicking on the control displayed in the system interface to the end of clicking on the control displayed in the system interface, in order to reduce a delay in starting the application, the first system sends a pre-operation message to the second system through the first system when the touch down event triggered in a beginning stage of the click operation is monitored by the first system.

Moreover, not all click operations in the system interface are configured to trigger the starting of the application. For example, when the smartwatch starts a constant light function, the click operation may be configured to trigger dynamic display of the system interface. Therefore, when monitoring the touch down event, the first system needs to further detect whether there is an intersection between the touch area corresponding to the touch down event and the target control area. The target control area is a display area of the target control in a system interface of the first system.

In some embodiments, when the first system is in the wake-up state, the first system sends the pre-operation message to the second system in response to the touch down event and there being the intersection between an intersection between a touch area corresponding to the touch down event and a target control area. The target control area is a display area of the target control in a system interface of the first system, and the target control is configured to start the target application in the second system.

In a possible embodiment, the storage area corresponding to the first system stores the control area information corresponding to each target control. The control area information may be expressed as (x, y, dx, dy), where (x, y) is the vertex coordinate of the target control, and dx and dy are control dimensions of the target control. When monitoring the touch down event, the first system detects whether there is an intersection between the touch area and the control area indicated by each control area information.

If there is the intersection between the touch area corresponding to the touch down event and the target control area, the first system sends the pre-operation message to the second system. If t there is no intersection between the touch area corresponding to the touch down event and the target control area, the first system will not send a pre-operation message to the second system.

Figure 7:
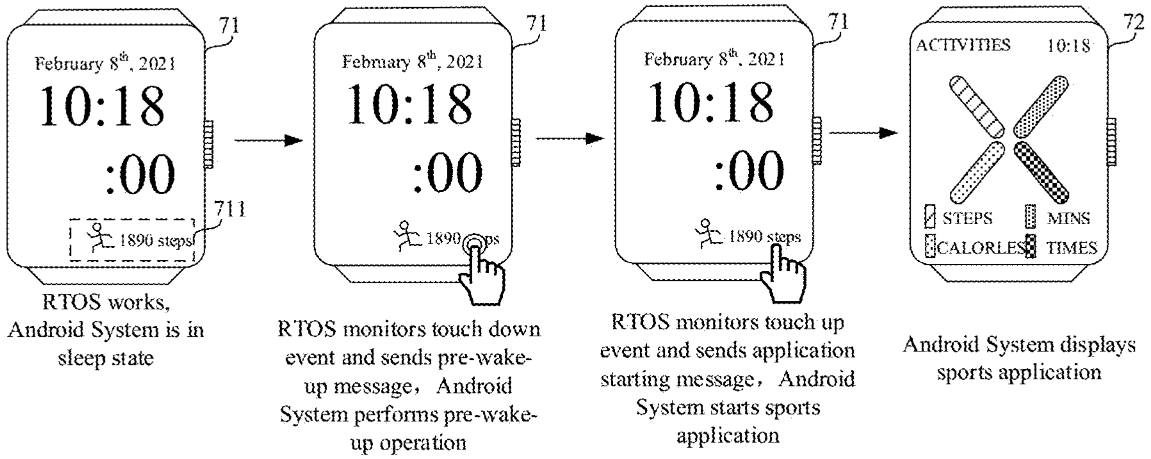
FIG. 7 is a schematic diagram of an interface of an application starting process according to an embodiment of the present disclosure.

Exemplarily, as illustrated in FIG. 7, a watch-face interface 71 of the RTOS displays a motion control 711. When the Android system is in the sleep state, the touch down event is monitored by the RTOS, and an intersection between a touch area and a control display area corresponding to the motion control 711 is detected, so as to send a pre-wake-up message to the Android system.

At block 602, the second system performs the pre-operation indicated by the pre-operation message.

Exemplarily, as illustrated in FIG. 7, the Android system performs a pre-wake-up operation after receiving the pre-wake-up message.

At block 603, the first system sends an application starting message to the second system in response to a touch up event.

When the touch up event continues to be monitored, it indicates an end of the click operation. At this time, the first system sends an application starting message including the application identifier to the second system, and the second system is instructed to start the target application.

The application starting message includes the application identifier of the target application, and the application identifier is determined based on the target control area.

In a possible embodiment, the first system stores a corresponding relationship between the control area information and the application identifier. After determining the target control area that intersects with the touch area, the first system determines the application identifier of the target application based on the above corresponding relationship, and adds the application identifier to the application starting message. The application identifier may be an application package name of the target application.

In some embodiments, after the touch down event is monitored by the first system, the application starting message is sent to the second system if a touch up event is monitored within a preset duration. The application starting message is not sent to the second system if the touch up event is not monitored within the preset duration (therefore, the operation is not the click operation, but a long-press operation). For example, the preset duration is 500 ms.

Exemplarily, as illustrated in FIG. 7, when the touch up event is monitored by the RTOS, the application starting message including a corresponding application identifier for the sports application is sent to the Android system.

At block 604, the second system starts the target application indicated by the application starting message.

Exemplarily, as illustrated in FIG. 7, the Android system starts and runs the application after receiving the application starting message. After the sports application is started, the smartwatch displays an application interface 72 of the sports application.

Figure 8:
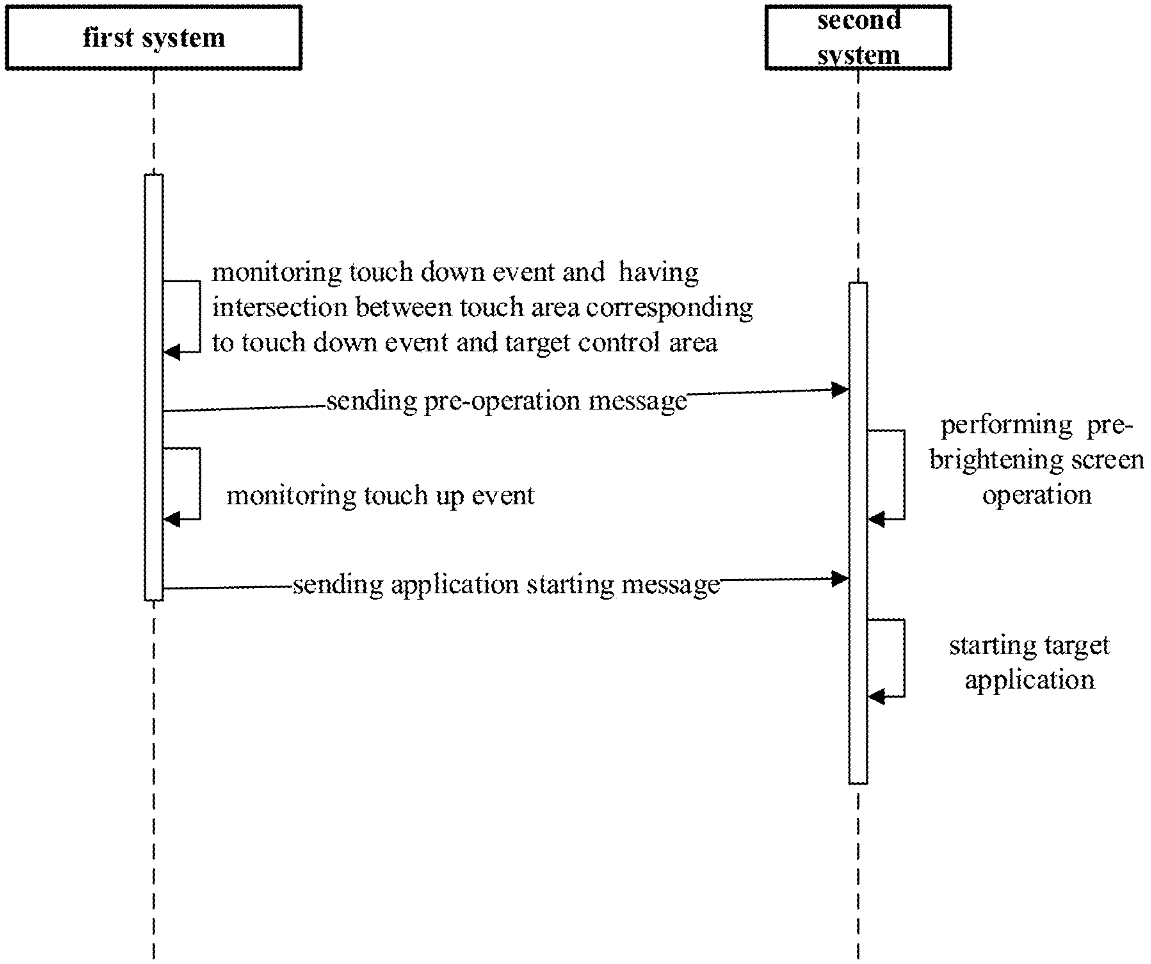
FIG. 8 a sequence diagram of a system interaction during an application starting process according to yet another embodiment of the present disclosure.

As illustrated in FIG. 8, when the first system is in the wake-up state, the pre-operation message is sent to the second system in response to the first system monitoring the touch down event and there being an intersection between the touch area and the target control area. After receiving the pre-operation message, the second system performs the pre-operation. When the touch up event is monitored subsequently by the first system, the first system sends the application starting message to the second system. The second system starts the target application based on the application starting message.

A layout location and a type of the target control in the corresponding system interface of the first system may be customized by the user. The target control in the system interface may also change when the system interface is changed. In a possible embodiment, in order to send the pre-operation message accurately, when the second system is in the wake-up state, the second system sends a control update message to the first system, and stores the control area information and application identifier through the first system. The control update message includes the control area information of the target control and the application identifier of the target application.

In an exemplary example, the corresponding relationship between the control area information and the application identifier is illustrated in Table 1.

TABLE 1

| Application Identifier | Control Area Information |
|---|---|
| xx sports | (10, 10, 40, 40) |
| xx chat | (300, 10, 40, 40) |
| xx weather | (10300, 40, 40) |

In a possible application scenario, when the second system is in the wake-up state, the second system determines control layout information of a switched system interface in response to the interface switching operation, so as to send the control update message to the first system based on the control layout information. The interface switching operation is configured to switch the system interface of the first system.

Controls in different system interfaces (such as watch-face interfaces) have different layout positions, for example, some watch-face interfaces have controls placed in four corners, while others have controls placed in the center. Therefore, when the user switches to the system interface of the first system, the second system needs to synchronize the control layout information of the switched system interface to the first system, which is stored by the first system. When the touch down event is subsequently monitored, whether there is an intersection between the touch area and each of the controls indicated by the control layout information is detected.

In some embodiments, when the first system is arranged with a plurality of system interfaces, such as a plurality of watch-face interfaces, control layout information corresponding to the plurality of system interfaces is stored simultaneously in storage space corresponding to the first system. When the first system receives the interface switching operation, the first system obtains corresponding control layout information of a current system interface.

In another possible application scenario, the second system determines control layout information of an edited system interface in response to an interface editing operation, so as to send the control update message to the first system based on the control layout information. The interface editing operation is configured to edit the system interface of the first system.

In addition to switching the system interface, a layout location and a type of the control in the system interface may be customized by the user. Therefore, when the user s edits the system interface through the second system, the second system needs to synchronize the control layout information of the edited system interface to the first system, which is stored by the first system. When the touch down event is subsequently monitored, whether there is an intersection between the touch area and each of the controls indicated by the control layout information is detected.

In the embodiment, when the user switches or edits the system interface of the first system under the second system, the second system synchronizes the switched control layout information or the edited control layout information to the first system, such that the first system is enabled to subsequently determine whether to send the pre-operation message to the second system based on the latest control layout information, thereby improving the accuracy of a pre-operation timing.

Figure 9:
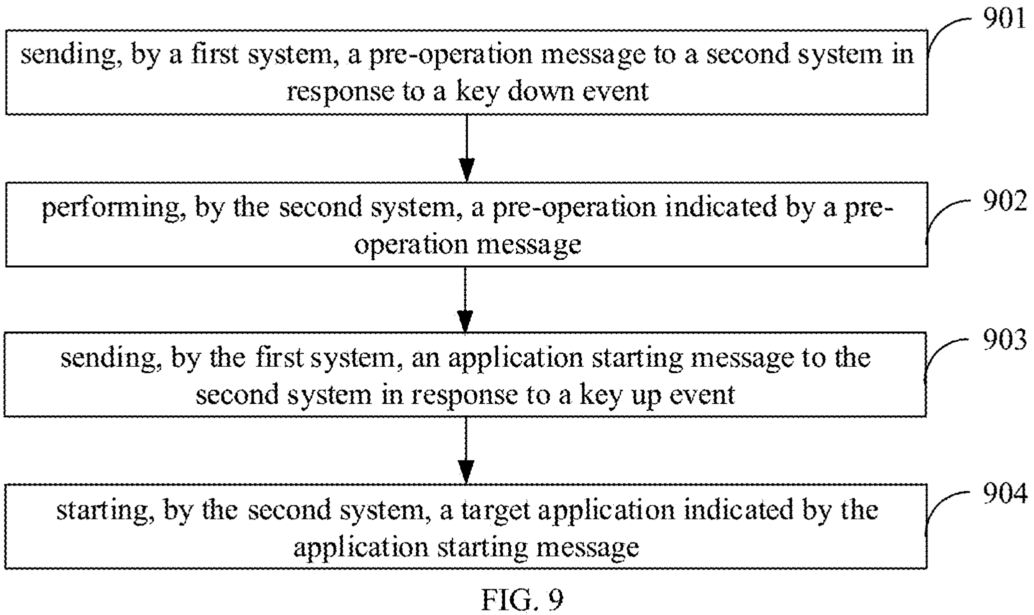
FIG. 9 is a flowchart of an application starting method according to yet another embodiment of the present disclosure.

As illustrated in FIG. 9, FIG. 9 is a flowchart of an application starting method according to yet another embodiment of the present disclosure. In this embodiment, the application starting operation as a key-pressing operation is taken as an example for illustration, and the method may include the following operations.

At block 901, a first system sends a pre-operation message to a second system in response to a key down event.

In some embodiments, when the first system is in the wake-up state, the electronic device displays a system interface of the first system, for example, the smartwatch displays the watch-face interface. The user may quickly start an application in the second system by pressing a physical key arranged on the electronic device. For example, for the smartwatch, the user may quickly start the application by pressing a crown. For smart glasses, the user may quickly start the application by pressing a key arranged on a temple.

Since it takes a certain amount of time from the beginning of pressing the physical key to the end of pressing the physical key, in order to reduce a delay in starting the application, the first system sends a pre-operation message to the second system when the first system monitors the key down event triggered in a beginning stage of the key-pressing operation.

Figure 10:
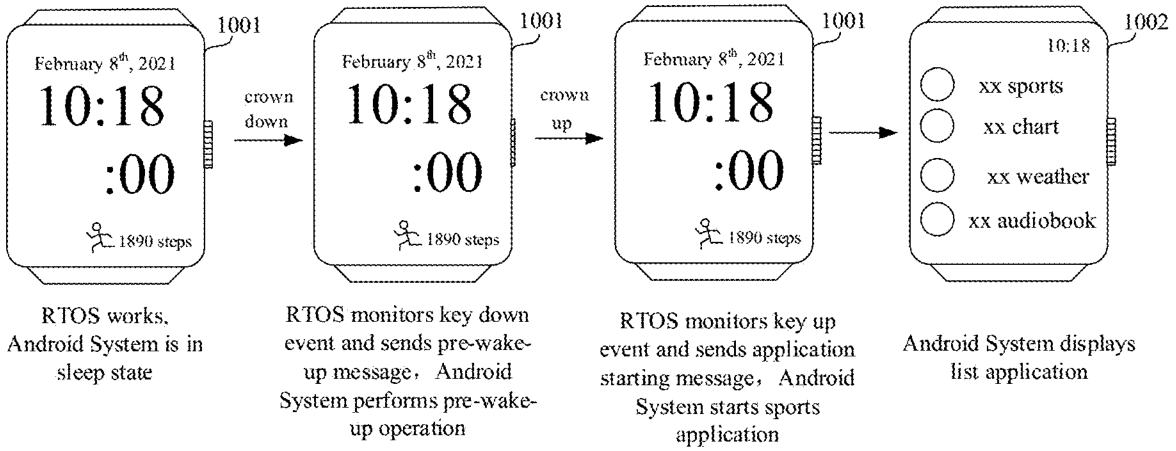
FIG. 10 is a schematic diagram of an interface of an application starting process according to an embodiment of the present disclosure.

Exemplarily, as illustrated in FIG. 10, when the RTOS is in the wake-up state and the Android system is in the sleep state, the smartwatch displays a watch-face interface 1001. When the user presses the crown, the key down event is monitored by the RTOS, so as to send a pre-wake-up message to the Android system.

At block 902, the second system performs the pre-operation indicated by the pre-operation message.

Exemplarily, as illustrated in FIG. 10, the Android system performs a pre-wake-up operation after receiving the pre-wake-up message.

At block 903, the first system sends an application starting message to the second system in response to a key up event.

When the key up event continues to be monitored, it indicates an end of the key-pressing operation. At this time, the first system sends an application starting message to the second system, and the second system is instructed to start the target application.

In a possible embodiment, pressing a same key for different times may be configured to start different applications. For example, pressing the crown of the smartwatch once is configured to trigger the starting of a list application (that is, all applications in the second system are displayed). Pressing the crown of the smartwatch twice is configured to trigger the starting of a timer application. Therefore, when the key up event is monitored by the first system and the key down event is not monitored within a preset duration after the key up event (that is, a last key up event is monitored), the first system sends the application starting message to the second system based on the number of pressing times of the key-pressing operation. The preset duration is the time interval between two consecutive key-pressing operations, such as 100 ms.

In some embodiments, the application starting message sent by the first system to the second system includes the number of pressing times of the key-pressing operation. The second system determines the target application to be started according to the number of pressing times (the first system has a corresponding relationship between the number of pressing times and the application).

When the second system is in the wake-up state, the second system determines shortcut key setting information in response to a shortcut key setting operation, so as to send an update message to the first system based on the shortcut key setting information. The shortcut key setting information includes a corresponding relationship between the number of pressing times of the key-pressing operation and the application identifier.

In some embodiments, the first system stores a corresponding relationship between the number of pressing times and the application identifier. The first system determines the application identifier of the target application based on the above corresponding relationship, and adds the application identifier to the application starting message. The application identifier may be an application package name of the target application.

As illustrated in FIG. 10, when the key up event is monitored by the RTOS, the target application is determined as the list application in a case that the number of pressing times of the key-pressing operation is one, so as to send the application starting message including the application identifier to the Android system.

At block 904, the second system starts the target application indicated by the application starting message.

Exemplarily, as illustrated in FIG. 10, the Android system starts the list application after receiving the application starting message. When the list application is started, the smartwatch displays an application list 1002 of the second system.

Figure 11:
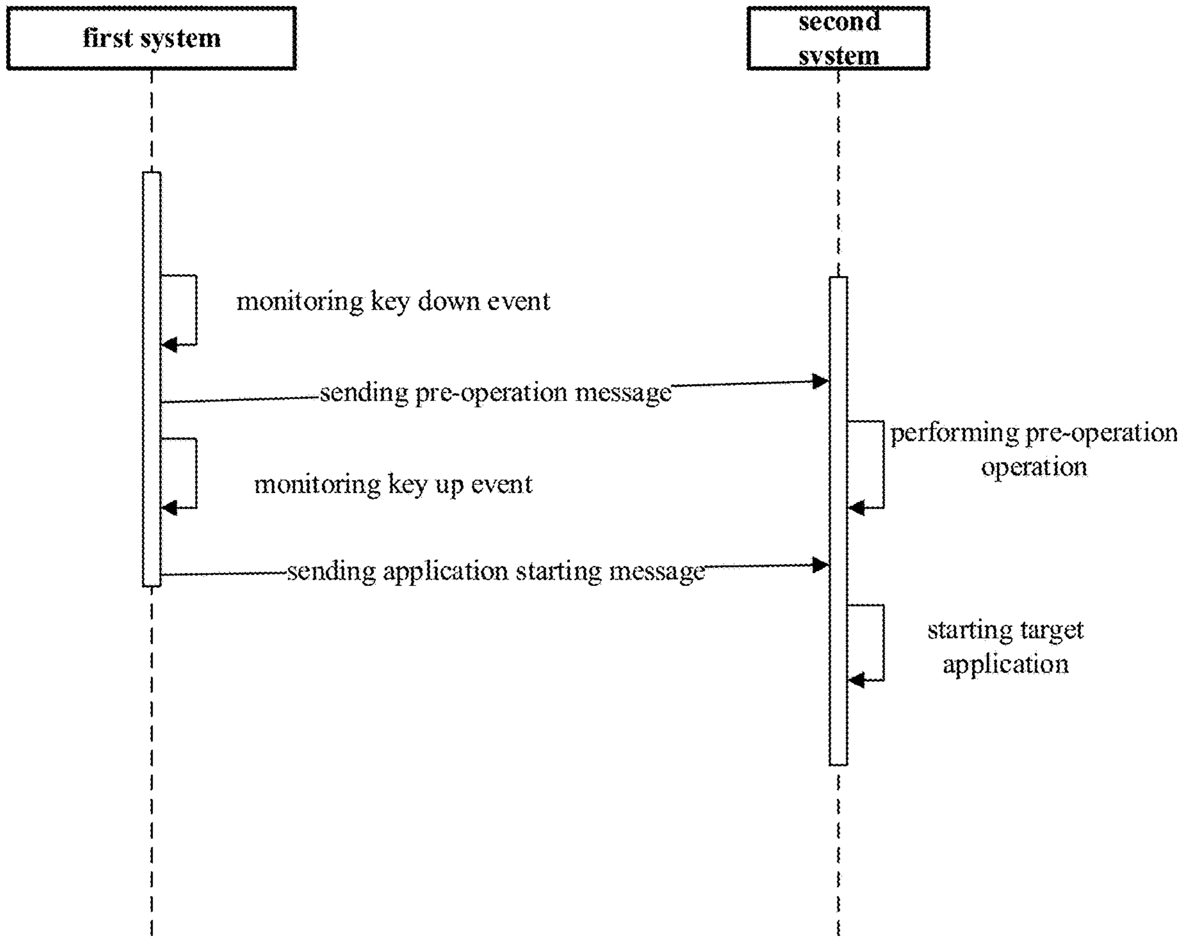
FIG. 11 is a sequence diagram of a system interaction during an application starting process according to an embodiment of the present disclosure.

As illustrated in FIG. 11, when the first system is in the wake-up state, the pre-operation message is sent to the second system in response to the first system monitoring the touch down event. After receiving the pre-operation message, the second system performs the pre-operation. When the key up event is monitored subsequently by the first system, the first system determines the target application based on the number of pressing times and sends the application starting message to the second system. The second system starts the target application based on the application starting message.

The above embodiments only take the electronic device arranged with a single key as an example to illustrate. In other possible embodiments, when the electronic device is arranged with a plurality of keys, it may achieve quick starting of different applications by pressing different keys, or it may achieve quick starting of applications by pressing the plurality of keys at the same time, which is not limited herein.

Figure 12:
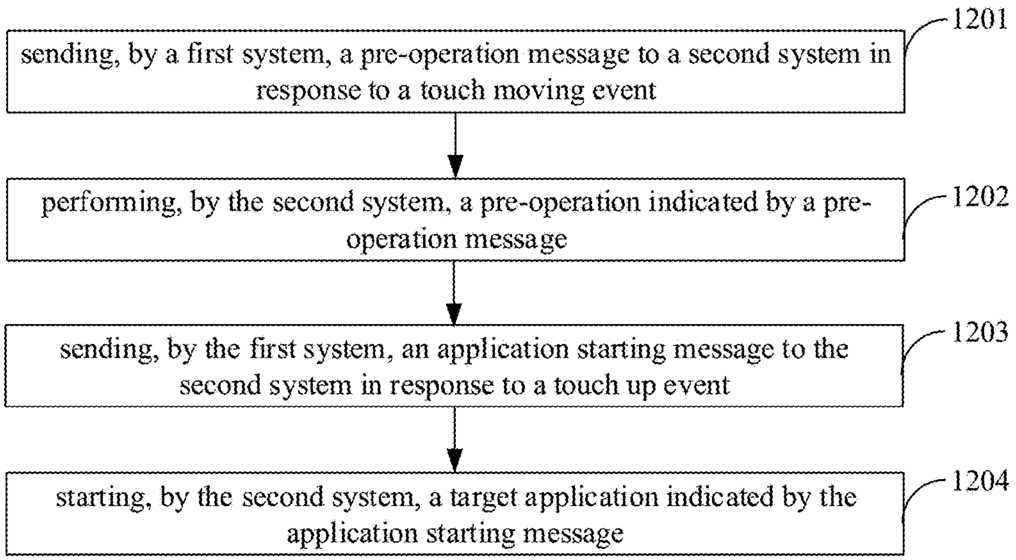
FIG. 12 is a flowchart of an application starting method according to yet another embodiment of the present disclosure.

As illustrated in FIG. 12, FIG. 12 is a flowchart of an application starting method according to yet another embodiment of the present disclosure. In this embodiment, the application starting operation as a moving operation is taken as an example for illustration, and the method may include the following operations.

At block 1201, a first system sends a pre-operation message to a second system in response to a touch move event.

In some embodiments, when the first system is in the wake-up state, the electronic device displays a system interface of the first system, for example, the smartwatch displays the watch-face interface. The user may quickly start an application in the second system by moving (single finger moving or multi finger moving) on the watch-face interface. For example, for the smartwatch, the user may quickly start the application by moving left on the watch-face interface, quickly start a second application by moving right on the watch-face interface, etc.

Since it takes a certain amount of time from the beginning of moving to the end of moving, in order to reduce a delay in starting the application, the first system sends a pre-operation message to the second system when the first system monitors the touch move event triggered in a beginning stage of the moving operation.

Moreover, not all moving operations in the system interface are configured to trigger the starting of the application. For example, only the left moving operation on the watch-face interface is configured to trigger the starting of the application, and moving operations in other directions are configured to trigger other functions (such as watch-face switch, state information display, or the like). Therefore, when monitoring the touch move event, the first system needs to further determine whether a moving parameter meets a system switching condition. If the moving parameter meets the system switching condition, the pre-operation message is sent to the second system. If the moving parameter does not meet the system switching condition, the pre-operation message is not sent to the second system.

In a possible embodiment, the system switching condition includes a moving direction and a moving distance. In response to the moving direction indicated by the touch move event being a target direction and the moving distance being greater than a distance threshold, the first system determines that the system switching condition is met. In response to the moving direction indicated by the touch move event not belonging to the target direction, or the moving distance being less than the distance threshold, the first system determines that the system switching condition is not met. The distance threshold is a distance in the target direction.

Figure 13:
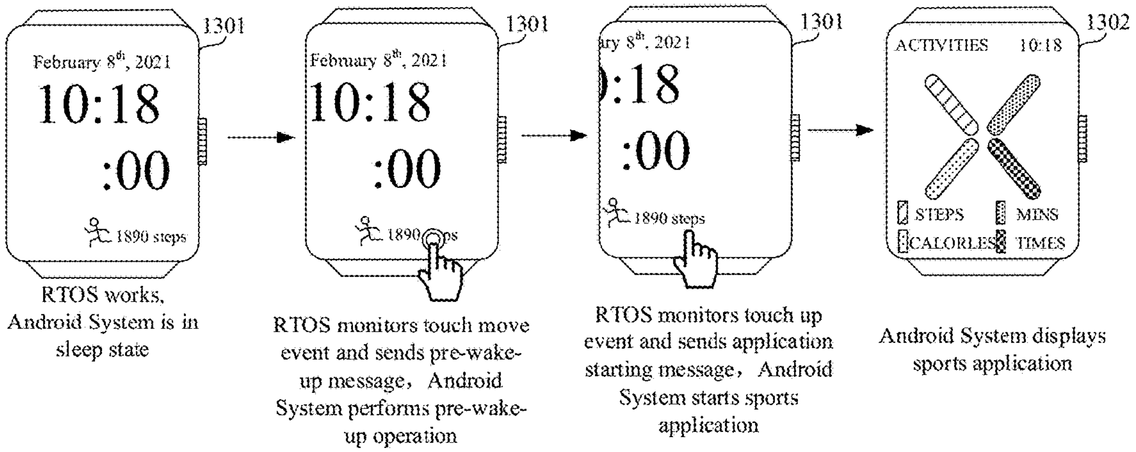
FIG. 13 is schematic diagram of an interface of an application starting process according to another embodiment of the present disclosure.

Exemplarily, as illustrated in FIG. 13, when the RTOS is in the wake-up state and the Android system is in the sleep state, the smartwatch displays a watch-face interface 1301. When the target direction is from right to left and the distance threshold is 200 px, the touch move event is monitored by the first system, and an indicated moving operation is the left moving operation. When the left moving distance is greater than 200 px, the first system sends a pre-wake-up message to the second system.

At block 1202, the second system performs the pre-operation indicated by the pre-operation message.

Exemplarily, as illustrated in FIG. 13, the Android system performs a pre-wake-up operation after receiving the pre-wake-up message.

At block 1203, the first system sends an application starting message to the second system in response to a touch up event.

When the touch up event continues to be monitored, it indicates an end of the moving operation. At this time, the first system sends the application starting message to the second system, and the second system is instructed to start the target application.

In a possible embodiment, he first system stores a corresponding relationship between the moving direction and the application identifier. The first system determines the application identifier of the target application based on the above corresponding relationship, and adds the application identifier to the application starting message. The application identifier may be an application package name of the target application.

In another possible embodiment, the first system adds the operation information of moving operation (such as the moving direction) to the application starting message. The second system determines the application identifier of the target application based on the operation information (such as the second system stores the corresponding relationship between the moving direction and the application identifier).

In some possible scenarios, the user's moving operation on the system interface may not be configured to start the application (possibly to erase a stain). Therefore, in a possible embodiment, in order to reduce a false starting of the application in the scenario, the first system sends the application starting message to the second system in response to the touch up event and the moving distance being greater than the distance threshold.

when the touch up event is monitored, the first system does not send an application starting message to the second system in response to the moving distance being less than the distance threshold. The moving distance may be determined according to a moving start point and a moving end point.

Exemplarily, as illustrated in FIG. 13, when the touch up event is monitored by the RTOS, the RTOS sends the application starting message to the Android system including the corresponding application identifier for the sports application due to the moving distance being greater than 200 px.

At block 1204, the second system starts the target application indicated by the application starting message.

Exemplarily, as illustrated in FIG. 13, the Android system starts the sports application after receiving the application starting message. When the sports application is started, the smartwatch displays an application interface 1302 of the sports application.

Figure 14:
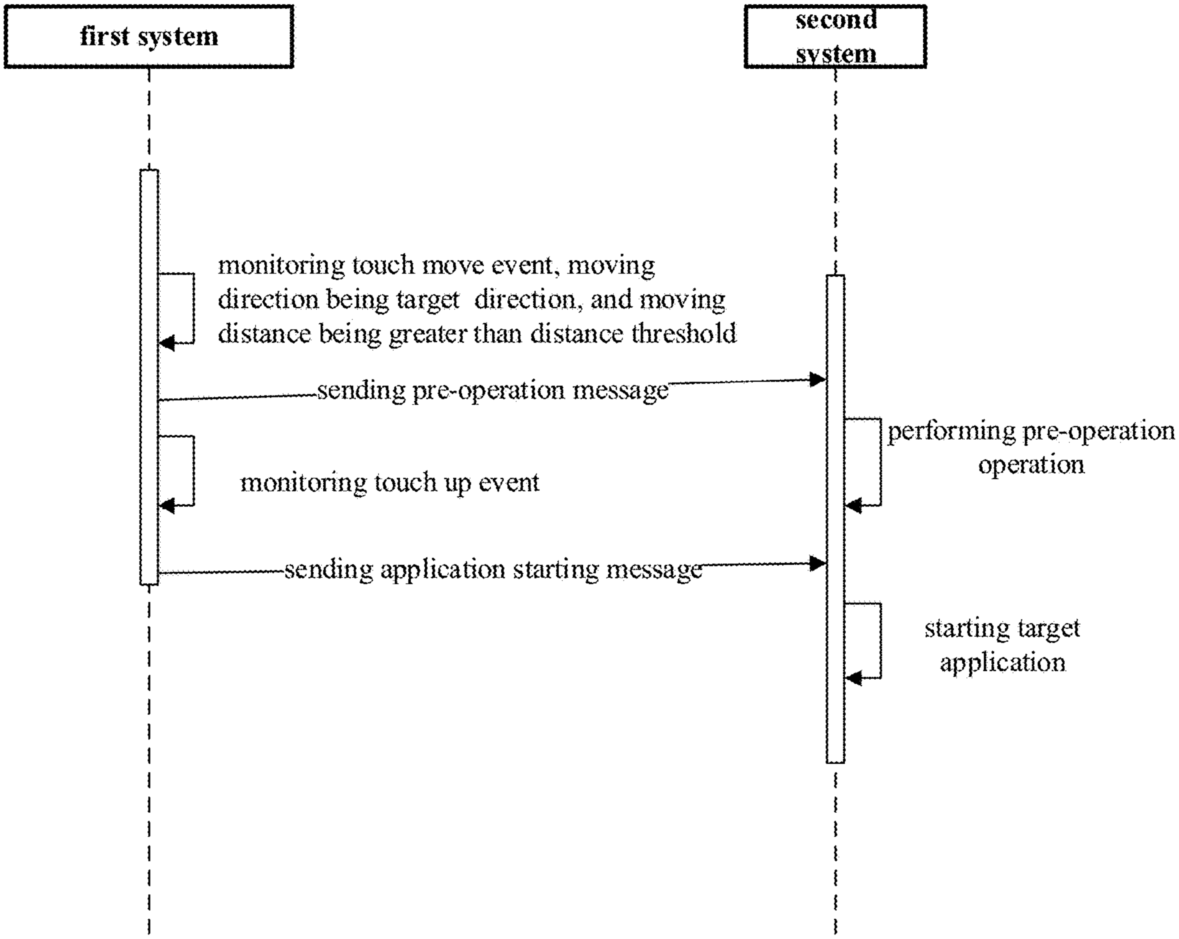
FIG. 14 is a sequence diagram of a system interaction during an application starting process according to an embodiment of the present disclosure.

As illustrated in FIG. 14, when the first system is in the wake-up state, the pre-operation message is sent to the second system in response to the first system monitoring touch move event, the moving direction being the target direction, and the moving distance being greater than the distance threshold. After receiving the pre-operation message, the second system performs the pre-operation. When the touch up event is monitored subsequently by the first system, the first system determines the target application based on the moving direction and sends the application starting message to the second system. The second system starts the target application based on the application starting message.

Figure 15:
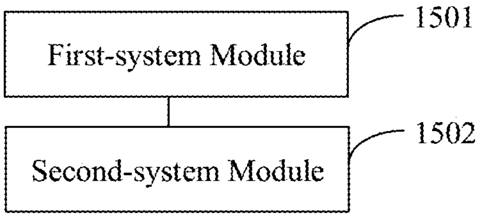
FIG. 15 a structural block diagram of an application starting apparatus according to another embodiment of the present disclosure.

As illustrated in FIG. 15, FIG. 15 a structural block diagram of an application starting apparatus according to another embodiment of the present disclosure. The apparatus may be implemented as all or part of an electronic device by software, hardware, or a combination of both. The apparatus includes a first-system module 1501 and a second-system module 1502.

The first-system module 1501 is configured to send a pre-operation message to the second-system module 1502 in response to a first operation event.

The second-system module 1502 is configured to perform a pre-operation indicated by the pre-operation message.

The first-system module 1501 is further configured to send an application starting message to the second-system module 1502 in response to a second operation event. The first operation event and the second operation event are events sequentially triggered in different operation stages during a process of an application starting operation. The application starting operation refers to an operation of starting a target application in the second-system module 1502 from the first-system module 1501.

The second-system module 1502 is further configured to start the target application indicated by the application starting message.

In some embodiments, the first-system module 1501 is configured to send a pre-wake-up message to the second-system module 1502 in response to the first operation event, when the second-system module 1502 is in a sleep state.

The second-system module 1502 is configured to perform a pre-wake-up operation.

In some embodiments, the second-system module 1502 is further configured to set a sleep prohibition duration, where the second-system module 1502 is prohibited from entering the sleep state within a prohibition duration after being pre-woken-up.

In some embodiments, when the second-system module 1502 is in a wake-up state, the first-system module 1501 is configured to send a pre-brightening screen message to the second-system module 1502 in response to the first operation event.

The second-system module 1502 is configured to perform a pre-brightening screen operation.

In some embodiments, the application starting operation is a click operation.

The first-system module 1501 is configured to send the pre-operation message to the second-system module 1502 in response to a touch down event, and is configured to send the application starting message to the second-system module 1502 in response to a touch up event.

In some embodiments, the first-system module 1501 is configured to send the pre-operation message to the second-system module 1502 in response to the touch down event and there being an intersection between an intersection between a touch area corresponding to the touch down event and a target control area. The target control area is a display area of the target control in a system interface of first-system module 1501, and the target control is configured to start the target application in the second-system module 1502.

In some embodiments, the first-system module 1501 is further configured to send an application starting message to the second-system module 1502. The application starting message includes an application identifier of the target application, and the application identifier is determined based on the target control area.

In some embodiments, the second-system module 1502 is further configured to send a control update message to the first-system module 1501 in response to the second-system module 1502 being in the wake-up state. The control update message includes control area information of the target control and the application identifier of the target application.

The first-system module 1501 is configured to store the control area information and the application identifier.

In some embodiments, when the second-system module 1502 is in the wake-up state, the second-system module 1502 is configured to determine control layout information of a switched system interface in response to an interface switching operation, where the interface switching operation is configured to switch the system interface of the first-system module 1501; and the second-system module 1502 is configured to send the control update message to the first-system module 1501 based on the control layout information.

In some embodiments, when the second-system module 1502 is in the wake-up state, the second-system module 1502 determines control layout information of an edited system interface in response to an interface editing operation, where the interface editing operation is configured to edit the system interface of first-system module 1501; and the second-system module 1502 is configured to send the control update message to the first-system module 1501 based on the control layout information.

In some embodiments, the application starting operation is a key-pressing operation.

The first-system module 1501 is configured to send the pre-operation message to the second-system module 1502 in response to a key down event, and is configured to send the application starting message to the second-system module 1502 based on the number of pressing times of the key-pressing operation, where the different numbers of pressing times correspond to different applications.

In some embodiments, the first-system module 1501 is configured to send the application starting message to the second-system module 1502 based on the number of pressing times of the key-pressing operation, where the different numbers of pressing times correspond to different applications.

In some embodiments, the application starting operation is a moving operation.

The first-system module 1501 is configured to send the pre-operation message to the second-system module 1502 in response to a touch move event, and is configured to send the application starting message to the second-system module 1502 in response to a touch up event.

In some embodiments, the first-system module 1501 is configured to send the pre-operation message to the second-system module 1502 in response to the touch move event and a moving parameter meeting a system switching condition.

In some embodiments, the first-system module 1501 is configured to send the pre-operation message to the second-system module 1502 in response to the touch move event, a moving direction being a target direction, and a moving distance being greater than a distance threshold, and is configured to send the application starting message to the second-system module 1502 in response to the touch up event and the moving distance being greater than the distance threshold.

In some embodiments, operating power consumption of the first-system module 1501 is lower than that of the second-system module 1502.

In conclusion, in embodiments of the present disclosure, for the electronic device supporting dual systems, if the first operation event triggered by the application starting operation is received when the first system is in the wake-up state, the first system sends the pre-operation message to the second system, and the second system is instructed to perform the pre-operation. When the second operation event triggered by the application starting operation is received, the first system sends the application starting message to the second system, and the second system is instructed to start the target application. During a continuous process of the application starting operation, the first operation event triggered first by the first system indicates the pre-operation required to be performed before the second system displays the application, thereby improving the speed of starting the target application after the second system receives the application starting message and facilitating reducing the delay in starting the target application in the second system from the first system.

Figure 16:
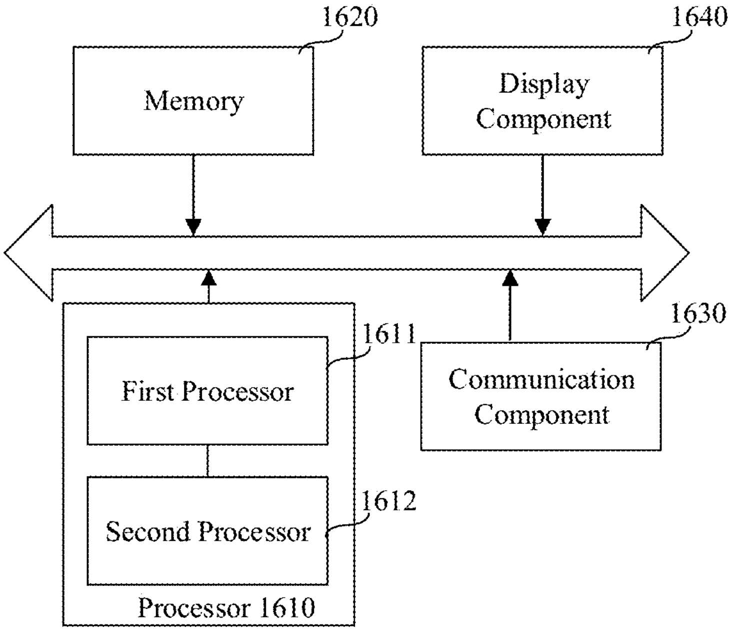
FIG. 16 is a structural block diagram of an electronic device according to another embodiment of the present disclosure.

As illustrated in FIG. 16, FIG. 16 is a structural block diagram of an electronic device according to another embodiment of the present disclosure. The electronic device in some embodiments of the present disclosure may include one or more of the following components: a processor 1610 and a memory 1620.

In some embodiments, the processor 1610 at least includes a first processor 1611 and a second processor 1616. The first processor 1611 is configured to run the first system, and the second processor 1616 is configured to run the second system. The first processor 1611 has power consumption lower than the second processor 1616, and the first processor 1611 has a performance lower than the second processor 1616. The processor 1610 is configured to connect to each part of the whole electronic device via various interfaces and lines, to execute various functions of the electronic device and process data by running or executing an instruction, a program, a code set, or an instruction set that are all stored in the memory 1620 and invoking data stored in the memory 1620. Optionally, the processor 1610 may be implemented by using at least one hardware form of a digital signal processing (DSP), a field-programmable gate array (FPGA), or a programmable logic array (PLA). The processor 1610 may integrate one or any combination of a CPU, a graphic processing unit (GPU), a neural-network processing unit (NPU), a modem, or the like. The CPU is mainly configured to process an operating system, a UI, an application program, or the like. The GPU is configured to render and draw content required to be displayed on the TP. The NPU is configured to realize an artificial intelligence (AI) function. The modem is configured to process wireless communication. It should be understood that the modem may also not be integrated into the processor 1610 and may be implemented via a chip separately.

The memory 1620 may include the RAM or the ROM. Optionally, the memory 1620 may include a non-transitory computer-readable storage medium. The memory 1620 is configured to store an instruction, a program, a code, a code set, or an instruction set. The memory 1620 may include a program storage area and a data storage area. The program storage area is configured to store instructions for implementing the operating system, instructions for implementing at least one function (such as a touch control function, a sound playing function, an image playing function, or the like), instructions for implementing the above embodiments, or the like. The data storage area is configured to store data (such as audio data, phonebooks, or the like) created according to the usage of the wearable device.

The electronic device in embodiments of the present disclosure further includes a communication component 1630 and a display component 1640. The communication component 1630 may be a Bluetooth component, a wireless fidelity (Wi-Fi) component, a near field communication (NFC) component, or the like, and is configured to communicate with an external device (a server or other terminal devices) via a wired network or a wireless network. The display component 1640 is configured to display the GUI and/or receive a user interaction operation.

In addition, those skilled in the art can understand that the structure of the electronic device illustrated in the foregoing figures does not constitute any limitation on the electronic device. The electronic device may include more or fewer components than illustrated or may combine certain components or have different configurations or arrangements of components. For example, the electronic device further includes components such as a radio frequency (RF) circuit, an input unit, a sensor, an audio circuit, a loudspeaker, a microphone, a power supply, or the like, which are not described herein again.

A computer-readable storage medium is further provided in embodiments of the present disclosure. The storage medium store at least one program, and the at least one program is configured to be executed by the processor to perform the application starting method as described in the foregoing embodiments.

A computer program product or computer program is further provided in embodiments of the present disclosure. The computer program product or computer program includes a computer instruction stored in a computer-readable storage medium. The computer instruction is configured to be read by the processor of the electronic device from the computer-readable storage medium, and the computer instruction, when executed by the processor, causes a terminal to perform the application starting method as described in the foregoing embodiments.

Those skilled in the art should understand that in one or more of the above embodiments, the functions described in embodiments of the present disclosure may be implemented by any one or any combination of a hardware, a software, or a firmware. When implemented by software, functions may be stored in the computer-readable medium or transmitted as one or more instructions or codes in the computer-readable medium. The computer-readable medium includes a computer storage medium and a communication medium. The communication medium includes any medium that facilitates the transfer of a computer program from one place to another place. The storage medium may be any available medium that can be accessed by a general-purpose computer or a special-purpose computer The above are only optional embodiments of the present disclosure and are not intended to limit the scope of protection of the present disclosure. any modification, equivalent arrangements, and improvement made within the spirit and principles of the present disclosure shall be included in the scope of protection of the present disclosure.

What is claimed is:

1. An application starting method applicable to an electronic device, the electronic device supporting running of a first operating system and a second operating system, and the method comprising:

sending, by the first operating system, a pre-operation message to the second operating system in response to a first operation event;

performing, by the second operating system, a pre-operation indicated by the pre-operation message;

sending, by the first operating system, an application starting message to the second operating system in response to a second operation event; and starting, by the second operating system, a target application indicated by the application starting message, wherein the first operation event and the second operation event are events sequentially triggered in different operation stages during a process of an application starting operation, the application starting operation refers to an operation of starting the target application in the second operating system from the first operating system.

2. The method as claimed in claim 1, wherein the sending, by the first operating system, a pre-operation message to the second operating system in response to a first operation event, comprises:

sending, by the first operating system, a pre-wake-up message to the second operating system in response to the first operation event, when the second operating system is in a sleep state; and the performing, by the second operating system, a pre-operation indicated by the pre-operation message, comprises:

performing, by the second operating system, a pre-wake-up operation.

3. The method as claimed in claim 2, further comprising:

setting, by the second operating system, a sleep prohibition duration, wherein the second operating system is prohibited from entering the sleep state within the sleep prohibition duration after being pre-woken-up.

4. The method as claimed in claim 1, wherein the sending, by the first operating system, a pre-operation message to the second operating system in response to a first operation event, comprises:

sending, by the first operating system, a pre-brightening screen message to the second operating system in response to the first operation event, when the second operating system is in a wake-up state; and the performing, by the second operating system, a pre-operation indicated by the pre-operation message, comprises:

performing, by the second operating system, a pre-brightening screen operation.

5. The method as claimed in claim 1, wherein the application starting operation is a click operation;

the sending, by the first operating system, a pre-operation message to the second operating system in response to a first operation event, comprises:

sending, by the first operating system, the pre-operation message to the second operating system in response to a touch down event; and the sending, by the first operating system, an application starting message to the second operating system in response to a second operation event, comprises:

sending, by the first operating system, the application starting message to the second operating system in response to a touch up event.

6. The method as claimed in claim 5, wherein:

the sending, by the first operating system, the pre-operation message to the second operating system in response to a touch down event, comprises:

sending, by the first operating system, the pre-operation message to the second operating system in response to the touch down event and there being an intersection between a touch area corresponding to the touch down event and a target control area, wherein the target control area is a display area of the target control in a system interface of the first operating system, and the target control is configured to start the target application in the second operating system; and the sending, by the first operating system, the application starting message to the second operating system in response to a touch up event, comprises:

sending, by the first operating system, the application starting message to the second operating system in response to the touch up event, wherein the application starting message comprises an application identifier of the target application, and the application identifier is determined based on the target control area.

7. The method as claimed in claim 6, further comprising:

sending, by the second operating system, a control update message to the first operating system in response to the second operating system being in the wake-up state, wherein the control update message comprises control area information of the target control and the application identifier of the target application; and storing, by the first operating system, the control area information and the application identifier.

8. The method as claimed in claim 7, wherein the sending, by the second operating system, a control update message to the first operating system in response to the second operating system being in the wake-up state, comprises:

determining, by the second operating system, control layout information of a switched system interface in response to an interface switching operation, when the second operating system is in the wake-up state, wherein the interface switching operation is configured to switch the system interface of the first operating system, and sending, by the second operating system, the control update message to the first operating system based on the control layout information; or determining, by the second operating system, control layout information of an edited system interface in response to an interface editing operation, when the second operating system is in the wake-up state, wherein the interface editing operation is configured to edit the system interface of the first operating system, and sending, by the second operating system, the control update message to the first operating system based on the control layout information.

9. The method as claimed in claim 1, wherein the application starting operation is a key-pressing operation;

the sending, by the first operating system, a pre-operation message to the second operating system in response to a first operation event, comprises:

sending, by the first operating system, the pre-operation message to the second operating system in response to a key down event; and the sending, by the first operating system, an application starting message to the second operating system in response to a second operation event, comprises:

sending, by the first operating system, the application starting message to the second operating system in response to a key up event.

10. The method as claimed in claim 9, wherein the sending, by the first operating system, the pre-operation message to the second operating system in response to a key up event, comprises:

sending, by the first operating system, the application starting message to the second operating system based on the number of pressing times of the key-pressing operation, wherein the different numbers of pressing times correspond to different applications.

11. The method as claimed in claim 1, wherein the application starting operation is a moving operation;

the sending, by the first operating system, a pre-operation message to the second operating system in response to a first operation event, comprises:

sending, by the first operating system, the pre-operation message to the second operating system in response to a touch move event; and the sending, by the first operating system, an application starting message to the second operating system in response to a second operation event, comprises:

sending, by the first operating system, the application starting message to the second operating system in response to a touch up event.

12. The method as claimed in claim 11, wherein the sending, by the first operating system, the pre-operation message to the second operating system in response to a touch move event, comprises:

sending, by the first operating system, the pre-operation message to the second operating system in response to the touch move event and a moving parameter meeting a system switching condition.

13. The method as claimed in claim 12, wherein the sending, by the first operating system, the pre-operation message to the second operating system in response to the touch move event and a moving parameter meeting a system switching condition, comprises:

sending, by the first operating system, the pre-operation message to the second operating system in response to the touch move event, a moving direction being a target direction, and a moving distance being greater than a distance threshold;

the sending, by the first operating system, the application starting message to the second operating system in response to a touch up event, comprises:

sending, by the first operating system, the application starting message to the second operating system in response to the touch up event and the moving distance being greater than the distance threshold.

14. The method as claimed in claim 1, wherein operating power consumption of the first operating system is lower than that of the second operating system.

15. An electronic device, comprising a processor and a memory, the memory storing at least one program, and the at least one program being configured to be executed by the processor to perform:

sending, by the first operating system, a pre-operation message to the second operating system in response to a first operation event;

performing, by the second operating system, a pre-operation indicated by the pre-operation message;

sending, by the first operating system, an application starting message to the second operating system in response to a second operation event; and starting, by the second operating system, a target application indicated by the application starting message, wherein the first operation event and the second operation event are events sequentially triggered in different operation stages during a process of an application starting operation the application starting operation refers to an operation of starting the target application in the second operating system from the first operating system.

16. The electronic device as claimed in claim 15, wherein in the sending, by the first operating system, a pre-operation message to the second operating system in response to a first operation event, the at least one program is configured to be executed by the processor to perform:

sending, by the first operating system, a pre-brightening screen message to the second operating system in response to the first operation event, when the second operating system is in a wake-up state; and in the performing, by the second operating system, a pre-operation indicated by the pre-operation message, the at least one program being configured to be executed by the processor to perform:

performing, by the second operating system, a pre-brightening screen operation.

17. A non-transitory computer-readable storage medium, the storage medium storing at least one program, the at least one program being configured to be executed by a processor to perform:

sending, by the first operating system, a pre-operation message to the second operating system in response to a first operation event;

performing, by the second operating system, a pre-operation indicated by the pre-operation message;

sending, by the first operating system, an application starting message to the second operating system in response to a second operation event; and starting, by the second operating system, a target application indicated by the application starting message, wherein the first operation event and the second operation event are events sequentially triggered in different operation stages during a process of an application starting operation, the application starting operation refers to an operation of starting a target application in the second operating system from the first operating system.

* * * * *